Jan. 2, 1934.  C. H. WHITE  1,941,504
HARROW
Filed Oct. 13, 1928  7 Sheets-Sheet 2
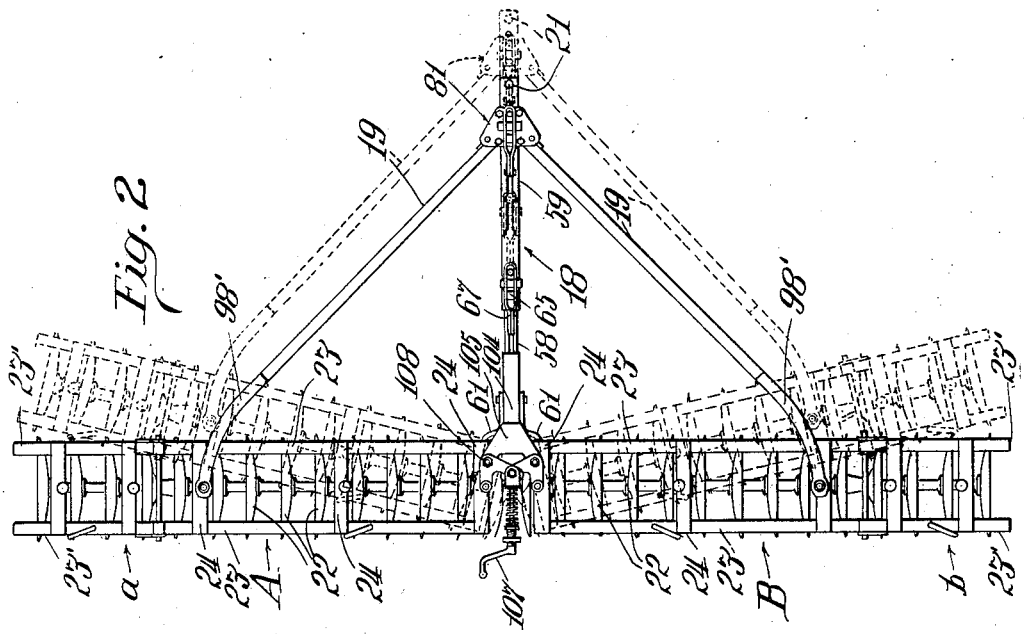
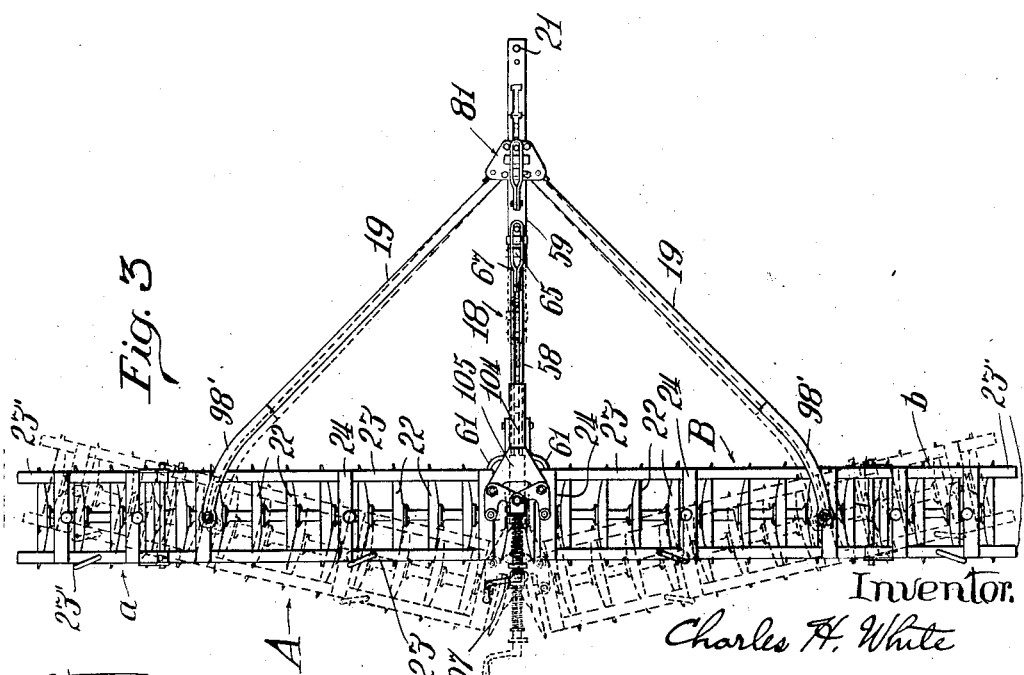

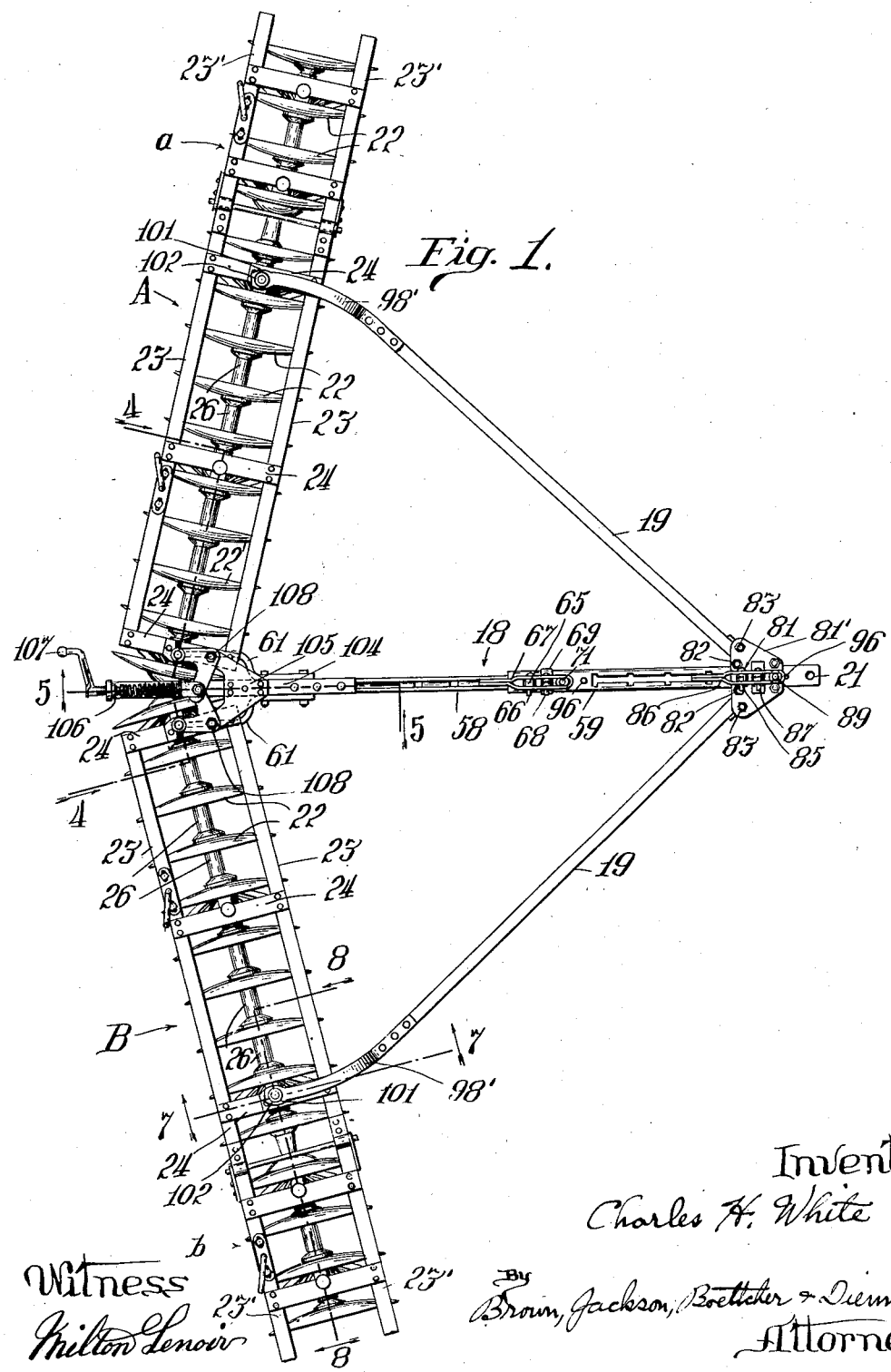

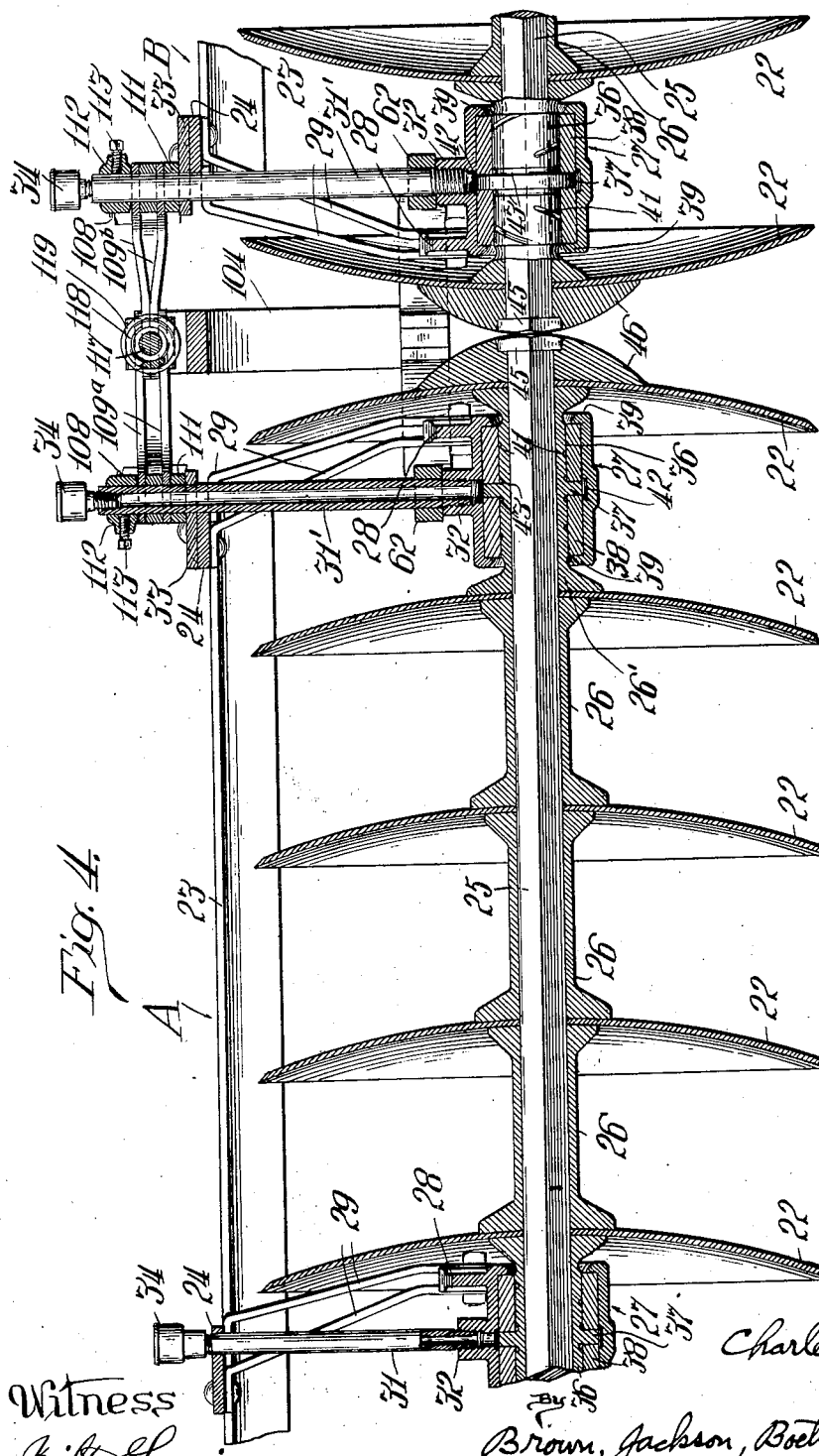

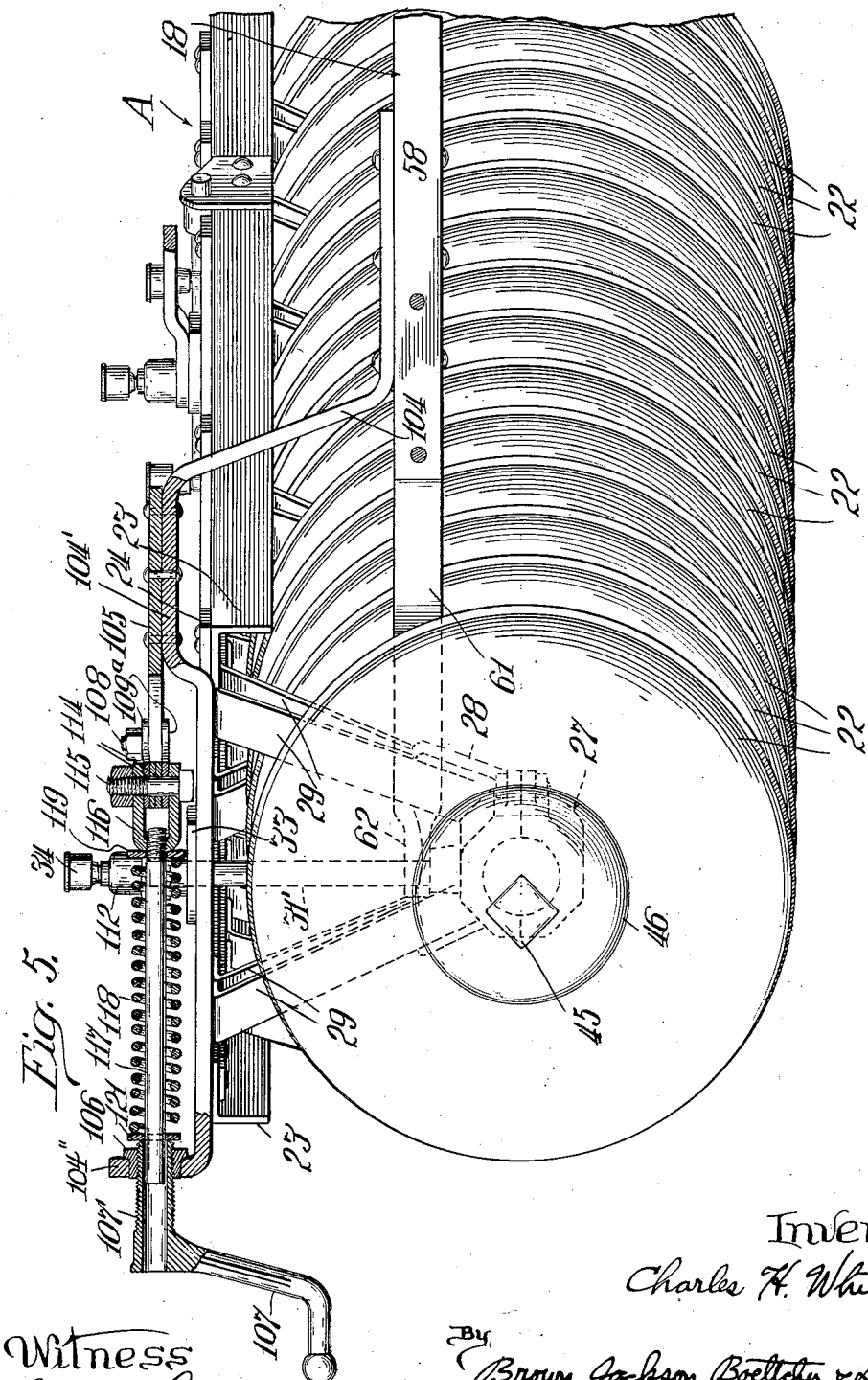

Jan. 2, 1934.  C. H. WHITE  1,941,504
HARROW
Filed Oct. 13, 1928  7 Sheets-Sheet 5

Inventor
Charles H. White
By Brown, Jackson, Boettcher & Dienner
Attorneys

Witness
Milton Lenoir

Jan. 2, 1934. C. H. WHITE 1,941,504
HARROW
Filed Oct. 13, 1928 7 Sheets-Sheet 6
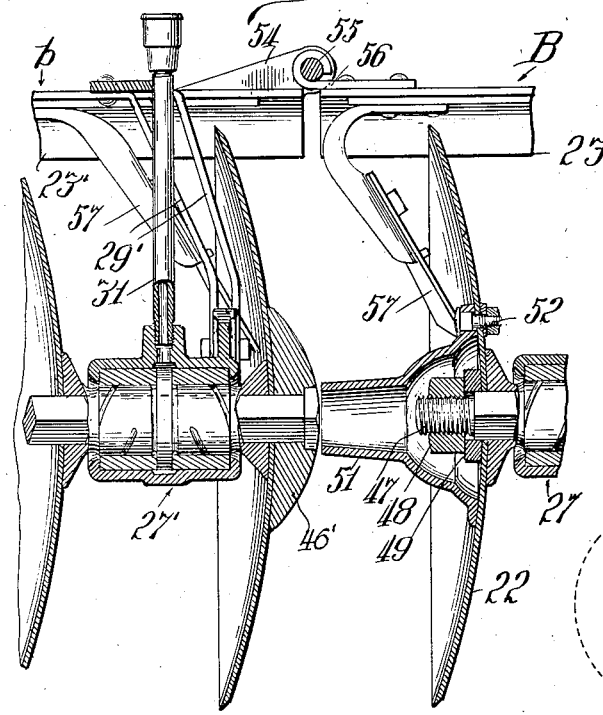
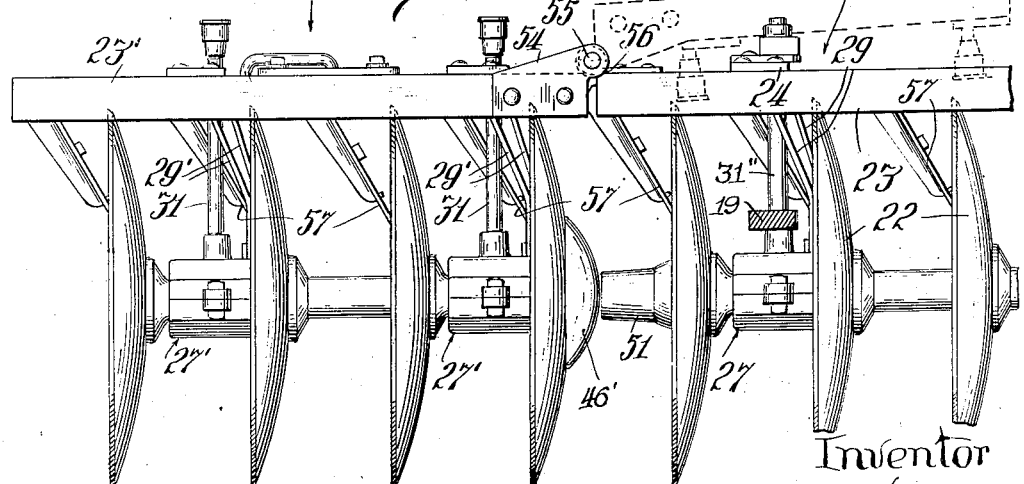
Inventor
Charles H. White
By Brown, Jackson, Boettcher & Dienner
Attorneys.

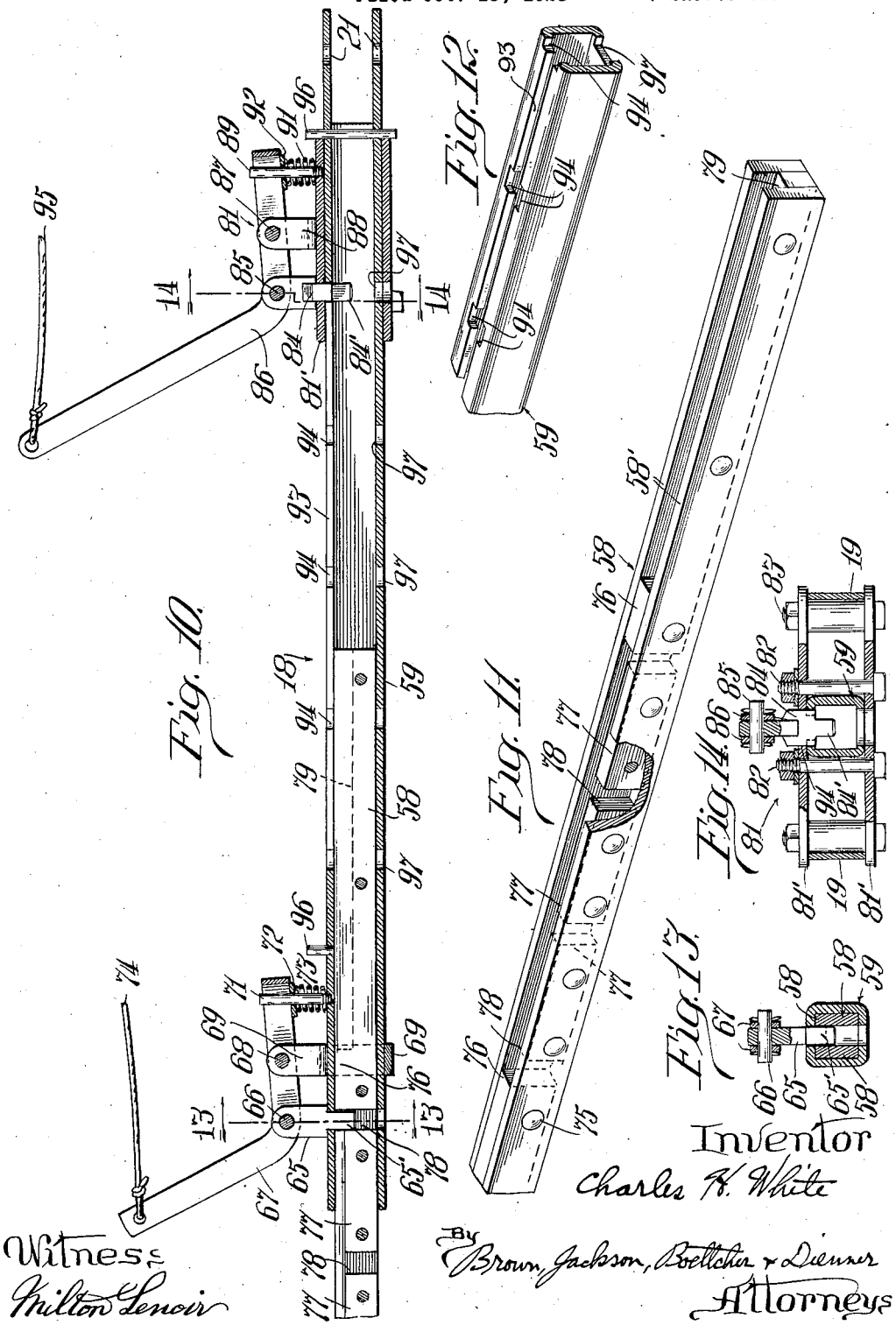

Patented Jan. 2, 1934

1,941,504

UNITED STATES PATENT OFFICE 1,941,504

HARROW

Charles H. White, Moline, Ill., assignor to Deere & Company, Moline, Ill., a corporation of Illinois Application October 13, 1928. Serial No. 312,325

54 Claims. (Cl. 55—81)

The present invention relates to harrows, having particular reference to disk harrows designed to be drawn by a tractor.

One of the principal objects of the invention is to provide improved means, utilizing the propelling power of the tractor, for angling and straightening the disk gangs. This improved mechanism is operative either to angle or straighten the gangs with the tractor travelling ahead, or to angle or straighten the gangs with the tractor backing rearwardly. Such ability to either angle or straighten the gangs when travelling in either direction is of great advantage in enabling the tractor to extricate itself from soft ground, and also facilitates the adjustment and maneuvering of the harrow.

For example, if the tractor becomes mired down in extremely soft soil, so that it cannot pull the load of the harrow in addition to its own weight, it is of great advantage to be able to straighten the gangs by backing the tractor, or, in some instances, to be able to straighten the gangs by travelling straight ahead. Moreover, the ability to angularly adjust the gangs or to straighten the same while the tractor is travelling continuously forwardly is of pronounced advantage in speeding up the harrowing operation, since it avoids the necessity of stopping, backing and starting the tractor. Each of these angling and straightening operations can be performed solely by the one operator on the tractor and without requiring that he dismount from the tractor.

Another object of the invention is to provide an improved arrangement of spring means for resisting the upward thrust of the inner ends of the two gangs. Such spring means is arranged to exert a tension between the inner ends of the gangs along a line disposed above the axes of the gangs. The bumpers through which the inner ends of the gangs contact with each other are disposed at the axes of the gangs, and by having this spring tension act in a plane disposed above said bumpers, the effect of such tension is to force the inner ends of the gangs downwardly, thereby resisting the tendency of these inner ends to cam upwardly under the opposing thrusts of the two oppositely facing gangs of disks. This spring means is adjustable to provide for different soil conditions, and is carried substantially in its entirety on the inner ends of the two gangs.

A further object of the invention is to provide a sectionalized construction of harrow wherein each of the two oppositely extending gangs is constructed of a plurality of pivotally connected gang sections. The advantage of such construction is two-fold. Each gang is given flexibility between its ends so that the inner and outer portions of the gang are free to rise and fall relatively to each other in passing over uneven ground. In addition thereto, the overall span or width of the harrow can be instantly increased or decreased by swinging the outer section of each gang into or out of operative engagement with the soil, such outer sections being pivotally connected with the inner sections of the gangs whereby they may be folded upwardly and over the tops of the inner sections to rest thereon. This enables the harrows to be instantly adapted to hard or loose soils, since by folding the outer sections over upon the inner sections, such inner sections are loaded with an additional weight for penetrating hard soils. The ability to reduce the over-all span also enables the implement to be drawn through gates and other cramped spaces without difficulty.

Another object of the present invention is to provide such connections for the outer gang sections that the above mentioned upward thrust of the inner ends of the gangs is resisted, these connections thus cooperating with the above mentioned spring means which exerts a tension between the inner ends of the gangs.

Another object is to provide a simplified design of harrow which will be cheaper and easier to construct and assemble. One of the features making this possible is the elimination of the transverse frame structure which usually extends across the implement in front of the gangs in prior disk harrows of this general type.

Other objects and advantages of the invention will appear in detail in the following description of a preferred embodiment of the invention.

In the drawings illustrating such embodiment:

Figure 1 is a plan view of the harrow, illustrating the gangs angled to a cultivating position;

Figure 2 is a similar view on a smaller scale, illustrating in dotted lines the operation of angling the gangs while travelling ahead;

Figure 3 is similar to Figure 2, illustrating the operation of angling the gangs by backing;

Figure 4 is a vertical axial sectional view through the inner ends of the two gangs, taken approximately on the plane of the line 4—4 of Figure 1;

Figure 5 is a sectional view, taken approximately on the fore and aft plane 5—5 of Figure 1, illustrating in longitudinal section the spring mechanism which resists up thrust of the inner ends of the gangs;

Figure 8 is a vertical axial sectional view through the outer portion of one of the gangs, taken approximately on the plane of the line 8—8 of Figure 1;

Figure 9 is a front elevational view of the outer portion of one of the gangs, illustrating in dotted lines the pivotally connected outer gang section folded back to its inoperative position;

Figure 10 is a longitudinal sectional view through the central draft member, illustrating the mechanisms by which the gangs are angled and straightened;

Figure 11 is a fragmentary perspective view of the bar which constitutes the rear element of the central draft member;

Figure 12 is a fragmentary perspective view, illustrating the formation of the tube which telescopes over this bar;

Figure 13 is a vertical sectional view through the rear latch mechanism taken on the plane of the line 13—13 of Figure 10; and Figure 14 is a similar sectional view through the slidable head and front latch mechanism, taken on the plane of the line 14—14 of Figure 10.

The main elements of the harrow comprise the two gangs A and B, which are disposed substantially abreast of each other in oppositely extending relation, the central or intermediate draft member 18, and the two outwardly extending lateral draft members 19, 19.

The rear end of the central draft member 18 has pivotal connection with the inner ends of both gangs, and the front end of the draft member is adapted to have draft connection with the tractor at the hitch point indicated at 21. The laterally divergent draft bars 19 are pivotally connected at their rear ends with the outer portions of the two gangs and have pivotal connection at their front ends with the central draft member 18 in a manner which will be hereinafter described.

Figure 7:
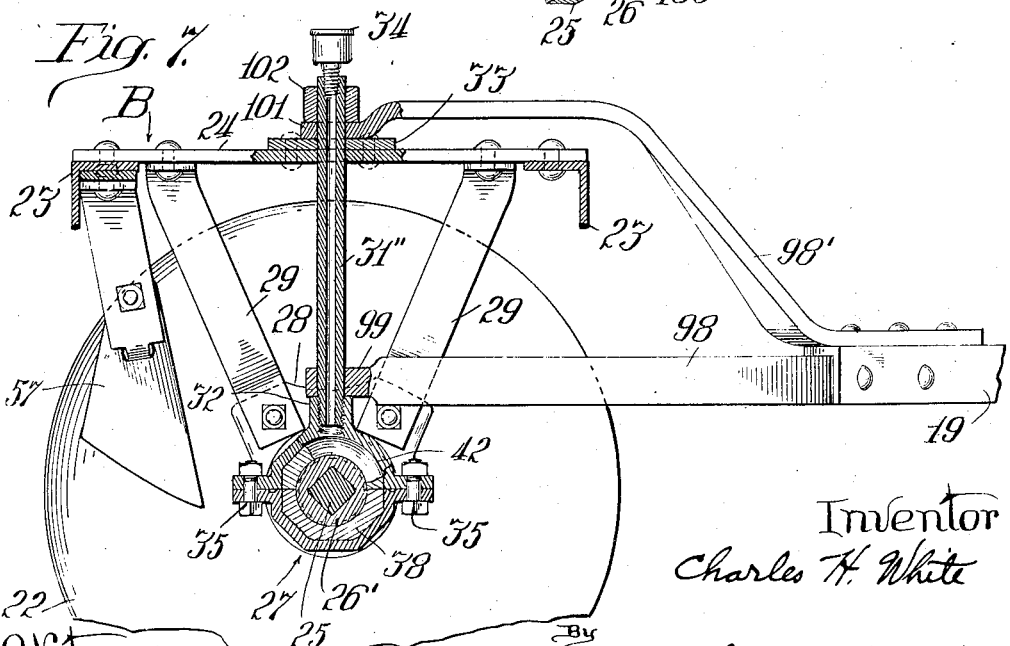
Figure 7 is a transverse sectional view through one of the gangs at the outer draft connection, as illustrated by the section plane 7—7 of Figure 1.

The two gangs are duplicates, with the exception that the disks 22 thereof face in opposite directions. Each comprises a frame built up of two parallel angle bars 23 which are cross-connected at spaced points by transverse frame bars 24. The disks of each gang or rather of the main section thereof, are mounted on a square shaft 25 rotating with the disks, the latter being held in spaced relation thereon by spacing sleeves or spools 26 disposed between the disks. The shaft 25 is journalled in bearings 27 located at spaced points longitudinally of the frame, the same being preferably disposed under each one of the cross bars 24 for mounting attachment thereto. As best shown in Figures 4 and 7, the inner end of each bearing is formed with an upwardly extending flange 28 to which are bolted pairs of depending bars 29. Referring to Figure 7, it will be seen that the lower ends of said bars are bolted to the flange 28 at points spaced to each side of the vertical axial plane of the bearing, and these bars diverge upwardly to their points of attachment to the cross bar 24, whereby they effectively carry the fore and aft stresses acting transversely of the gang frame.

Referring to Figure 4, it will also be seen that each companion pair of bars 29 is secured to opposite sides of the flange 28 and extend upwardly therefrom to the cross-bar 24 in spaced relation so that they effectively carry stresses acting longitudinally of the gang frame. Each bearing 27 is additionally reenforced by a post 31 which screws into a threaded boss 32 projecting upwardly from the bearing, said post extending vertically therefrom and being secured at its upper end to the adjacent cross-bar 24, either by extending through an opening in said cross-bar or by being attached to a bracket 33 secured thereto. Each post is tubular for conveying lubricant from an upper lubricant fitting 34 down to the bearing surfaces of the bearing 27. The post 31' at the inner end of each gang constitutes a vertical pivot axis through which the draft forces are transmitted from the central draft member 18 to the inner ends of the gangs, as will be presently described. Similarly, the post 31'' adjacent to the outer end of each main gang section constitutes a vertical pivot axis to which the draft forces are transmitted from the laterally divergent draft bar 19 to the outer portion of the gang.

The construction of the bearing 27 is unique, in that the thrust sustaining surfaces are spaced inwardly from the ends of the bearings and, hence, are practically inaccessible to dirt and grit. The several bearings for both gangs are all duplicates, each being constructed of upper and lower housing sections having laterally projecting flanges bolted together, as indicated at 35 in Figure 7.

The spacing sleeve 26' extending through the bearing is specially formed with a rotating bearing surface 36, from the central portion of which projects an annular radial flange or collar 37. Referring to Figure 7, it will be seen that the interior of the bearing housing is polygonal in cross-section, and mounted in its polygonal bore are semi-cylindrical bearing blocks 38, the outer surfaces of which are also polygonal to hold the same against rotation in the housing. Said bearing blocks are disposed in pairs on opposite sides of the central thrust collar 37, the ends of the blocks bearing against the sides of the thrust collar and functioning as radial thrust surfaces for carrying the end thrust set up in the shaft 25. The blocks are held against displacement from the ends of the bearing housing by inwardly turned flanges 39 at the ends of the housing which embrace the ends of the blocks. The rotating bearing surfaces 36 to each side of the thrust collar 37 are formed with one or more helical grooves 41, which are spiraled in a direction tending to convey any particles of dirt outwardly towards the outer ends of the bearing. Thus, with the forward rotation of the disks, in the forward travel of the implement, these grooves act continuously to convey any particles of dirt outwardly, away from the thrust surfaces between the ends of the bearing blocks 38 and the sides of the thrust collar 37.

Such bearing blocks may be constructed of a soft bearing metal, but I find it preferable to construct the same of wood. These become thoroughly saturated with lubricant, and have the further advantage of being replaceable at minimum cost. The lubricant passing down through the adjacent post 31, enters an annular groove 42 formed in the interior of the bearing housing around the thrust collar 37. Formed in the rotating bearing surfaces 36 on each side of the thrust collar are grooves 43 which aid in distributing the lubricant. Preferably, the inner ends of the helical grooves 41 do not extend to the grooves 43 or to the thrust collar, so that dirt cannot reach the thrust surfaces through said grooves 41. The curvature of the flanged ends of the spool 26' is so proportioned and formed with respect to the formation of the inwardly turned flanges 39 that there is a minimum tendency for dirt to gain access to the ends of the bearings. That is to say the space between the inwardly directed flange 39 of the bearing housing and the adjacent surface of the flanged end 26' of the spool 26 is formed on a taper with the widening part of the taper extending outwardly away from the shaft. Hence dirt thrown up by the disk above the bearing can not work its way into the end of the bearing readily because the taper converges in this direction, whereas when this dirt revolves around to the under side of the shaft, it can fall out very readily because the taper diverges in the outward direction.

As shown in Figure 4, the two shafts 25 extend beyond the innermost disks of their respective gangs and are formed with heads 45 for engaging in countersunk openings in spherical end caps 46 bearing against the convex sides of the end disks. These heads 45, together with the caps 46, constitute bumpers which normally contact with each other when the harrow is in cultivating operation, whereby the inwardly acting end thrusts of the two gangs balance each other in the abutting contact between the bumpers.

Figure 6:
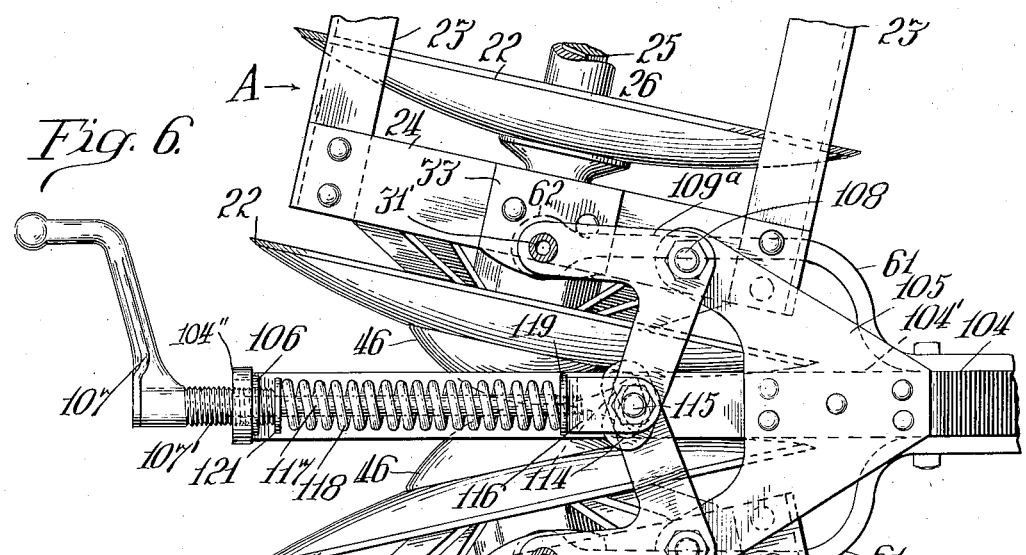
Figure 6 is a fragmentary plan view illustrating this spring mechanism.

Referring to the plan view in Figure 6, attention is directed to the fact that the spherical curvature of each bumper has its center coincident, in each case, with the vertical pivot axis extending down through the post 31' so that in all angling and straightening movements of the gangs, the rolling contact between the bumpers will leave the spacing between the two pivot axes 31', 31' substantially the same.

Each shaft 25 extends outwardly to the outer end of the main section of its respective gang, where said shaft passes through the end disk of the section and is provided with a reduced threaded end 47 (Figure 8) for receiving a nut 48 which draws a washer 49 up against the concave outer side of the disk. The tension which can be exerted on the shaft through the nut 48 rigidly binds all of the disks in fixed position through pressure exerted between the disks and the spacing sleeves 26. Enclosing the clamping nut 48 and projecting outwardly from the concave side of the end disk is a shell 51 which is detachably secured to the disk by bolts 52. Said shell serves as an axial abutment adapted to engage with the disk assembly of the outer gang section, which I shall now describe.

Referring to Figure 9, this outer gang section, designated $b$ in its entirety, constitutes a pivotally connected extension of the main gang section. The construction thereof is substantially a duplication of the construction of the main gang section, such outer gang section being preferably shorter than the main section.

The parallel frame bars 23' of the outer section have pivot brackets 54 secured thereto for engaging over the ends of a pivot shaft 55 extending transversely of the gang. Clips or brackets 56 are secured to the corresponding frame bars of the main section and engage the shaft 55 on the inner sides of the brackets 54, thereby pivotally connecting the two gang sections together, for relative vertical hinge movement. The disk assembly of this outer section is journalled in bearings 27' which are secured to the extension frame by the supporting bars 29' and posts 31 in the same manner described of the construction shown in Figure 4. The inner end of this disk assembly has a spherical bumper 46' mounted thereon, similarly to the bumper 46 at the inner ends of the main gang sections. The bumper 46' is adapted to contact with the end of the tubular shell 51 to limit the extent to which the outer gang section can tilt downwardly relatively to the main gang section, and said bumper may also serve to transmit the end thrust of the outer series of disks to the shaft 25 of the main gang section. The forward draft during operation is transmitted through the pivotal connection 55 between the sections $b$ and B and the bearings 27' to the outer sections $b$.

It will be seen that the foregoing construction results in each of the two oppositely extending gangs being flexible intermediate its ends, that is to say, the main section and the outer section of each gang can tilt or rock vertically relatively to each other so that the gang can better adapt itself to irregularities in the surface of the ground.

As a further advantage, if the soil being harrowed is hard, the two outer sections $a$ and $b$ can be folded upwardly and over upon the upper sides of the main section, as illustrated in dotted lines in Figure 9. It will be noted that with the outer sections in this folded position their weight is imposed on the disks of the main sections which aids in forcing the disks into the ground. Similarly, when passing through a gate or other narrow space, the two outer sections can be folded back to increase the clearance of the harrow. If the pulling power of the tractor is insufficient to pull the entire width of the harrow, the two outer sections $a$ and $b$ can be removed by simply releasing the pivot shafts 55, provision being made for readily withdrawing said shafts from their pivot brackets. The disks of both gang sections are provided with individual series of scrapers 57 mounted for adjustment on the main section and on the outer section, but inasmuch as the details of this construction do not form any part of the present invention, I shall not describe the same.

Referring, now, to the draft connections and to the adjusting mechanisms through which the gangs are angled and straightened, it will be seen from Figure 10 that the central draft member 18 comprises two telescoping sections consisting of the bar 58 and the outer tube or sleeve 59 which slides lengthwise over said bar. The rear end of the bar 58 has pivotal draft attachment with the inner ends of both gangs, and the front end of the outer telescopic section 59 has extending ears provided with apertures to form the hitch connection 21.

Referring to Figures 5 and 6, it will be seen that a yoke or fork extends rearwardly from the rear end of the bar 58, the same consisting of the two curved bars 61, which are rigidly secured to the sides of the bar 58. The rear ends of the yoke arms 61 are formed with pivot bosses 62, which engage rotatably over the vertical pivot posts 31' at the inner ends of the two disk gangs, such bosses preferably bearing upon the upper ends of the threaded bosses 32 into which said posts screw (see Figure 4). The yoke 61, 61 transmits draft to the inner ends of the two disk gangs, while still permitting these ends of the gangs to be swivelled in the yoke hubs 62 in the operation of angling and straightening the gangs. Extension and contraction of the central draft member 18 is governed by a latch 65 which controls relative telescoping movement between the bar 58 and tube 59. Such latch is pivotally connected at 66 between the parallel sides of a bell-crank lever 67, which is fulcrumed at 68 to a bracket 69 encircling and secured to the rear portion of the tube 59. The lever is constructed in the form of a bar looped or doubled back on itself and the forward looped portion thereof engages over a pin 71 extending upwardly from the tube 59. A collar 72 on this pin engages the under side of the lever and bears upon a compression spring 73 confined on said pin, the action of said spring being to normally force the pawl 65 down into latching engagement with the bar 58. The upwardly extending arm of the lever 67 is adapted to have a trip rope 74 connected thereto, such trip rope extending forwardly to the tractor and enabling the operator to release the latch pawl 65 from his position on the tractor.

The pawl has a reduced lower end 65' extending down through an opening in the tube 59 and adapted to engage with latching shoulders on the bar 58.

As shown in Figure 11, said bar is preferably built up of two spaced outer bar sections 58' between which inner bar sections or blocks are secured by rivets 75. The range of telescopic movement between the bar 58 and tube 59 is limited by two stop blocks 76, which have their upper edges flush with the side bar sections 58'. Between these limit blocks is a series of smaller blocks 77 which have their ends spaced from each other and from the adjacent ends of the limit blocks 76, thereby defining a plurality of pockets or shoulders 78 between the adjacent ends of all of the blocks. The upper surfaces of the smaller blocks 77 are disposed below the upper surfaces of the side bars 58' to define a longitudinal groove in the top of the bar 58. Tripping the latch releasing lever 67 raises the nose 65' of the latch to the point where the smaller blocks 77 can pass under the same. Relative extending or contracting movement will then occur between the bar 58 and tube 59, depending upon whether the tractor is moving forwardly or backwardly. Releasing the pull on the trip rope 74 permits the latch 65 to snap into one of the pockets 78, thereby locking the central draft member at a fixed length of adjustment. The latch 65 is prevented from being withdrawn entirely out of the hole in the tube 59 by the spring 73 being compressed to a solid condition, although, if desired, a suitable stop may be provided to limit the angular movement of the lever 67 in the latch releasing direction.

Thus, with the latch raised to its releasing position, some portion thereof still extends down into the longitudinal groove in the bar 58 for engaging with the limit blocks 76, 76, thereby limiting the extending and contracting movement between the bar 58 and tube 59. The front portion of the bar 58 has a longitudinal groove 79 formed therein, extending from the end of the bar up to the front limit block 76, such groove receiving the pawl of the front latch mechanism, which I shall now describe.

Mounted for sliding movement on the outer side of the tube 59 is a head member 81 to which the front ends of the diagonal draft bars 19 are pivotally connected. As shown in Figures 12, 13 and 14, the tube or sleeve 59 is of rectangular cross-section, and the head 81 comprises two plates 81', having slidable bearing engagement on the upper and lower flat sides of the tube. Pairs of bolts 82 extend vertically through the two plates on either side of the tube to form vertical guides for engagement therewith. Bolts 83 extend through the outer rear corners of the plates 80 and serve as pivot members for pivotally connecting the front ends of the diagonal draft bars 19 to the slidable head 81, such draft bars being looped around said bolts or having any other suitable pivotal connection therewith. Relative sliding movement between the head 81 and tube 59 is controlled by a latch 84, which is pivotally connected at 85 to a bell crank lever 86. Said lever is constructed similarly to the lever 67, being fulcrumed at 87 to a bracket 88 rising from the slidable head, and having its looped front end engaging over a pin 89 around which is confined a spring 91, there being a washer 92 interposed between said spring and the under side of the lever.

As shown in Figure 12, the upper side of the tube 59 is formed with a longitudinal groove 93, and cut back laterally from the edges of this groove at spaced points along the length thereof are notches 94, 94. As shown in Figure 14, the latch 84 is of T-shape, comprising an upper relatively wide portion and a depending narrow portion 84'. The latch extends down through an opening in the top plate 81' of the head, and the parts are so proportioned that the relatively wide portion of the latch is only receivable in the notches 94, whereas the narrow lower portion 84' is free to slide lengthwise in the groove 93. Pulling on the trip rope 95, which is connected to the latch releasing lever 86, is effective to raise the wide portion of the latch from its engagement in a pair of notches 94, permitting relative sliding movement between the head 81 and the tube 59 with the narrow portion 84' of the latch moving in the slot 93. Releasing the trip rope 95 permits the wide portion of the latch to snap down into the adjacent pair of transverse notches 94, thereby rigidly locking the head 81 to the tube 59. The groove 79 in the front end of the rear telescoping bar 58 receives the narrow lower end 84' of the latch pawl 84 when this bar and the head 81 approach each other in the operation of angling or straightening the gangs. The range of sliding movement between the head 81 and tube 59 is limited by vertical pins 96 projecting from the tube, which pins are engaged by the ends of the slidable head. A plurality of holes 97 may be formed in the bottom wall of the tube 59 to prevent the accumulation of dirt therein.

Referring to Figure 7, the rear end of each diagonal draft bar 19 is provided with an extension bar 98 having a bearing hub 99 at its end which engages rotatably over the vertical pivot post 31'' which is located adjacent to the outer end of the main gang section. The hub 99 preferably rests upon the threaded boss 32, into which the pivot post screws. Another extension bar 98' which is secured to the upper side of the diagonal draft bar 19 extends upwardly and over the top of the gang frame where it is provided with a bearing hub 101 engaging rotatably over the projecting upper end of the pivot post 31'', a collar 102 being secured over the end of the post to hold the bearing hub 101 in place. The two extension bars 98, 98' form a vertical fork in the arms of which the outer portion of the disk gang has pivotal mounting for horizontal swivelling movement in the angling or straightening of the gangs, the two arms of such yoke or fork holding the frame of the gang upright in its proper position.

Referring now to the improved adjustable spring mechanism, which resists upward thrust between the inner ends of the gangs, it will be seen from Figures 5 and 6 that a supporting bar 104 is secured to the rear extensible bar 58 of the central draft member, and rising therefrom extends centrally backwardly between the inner ends of the gangs, substantially in the plane of the gang frames. The raised forward portion of said bar has an arched portion 104' to which is secured a yoke shaped plate 105, and the rear end of the bar 104 is bent upwardly at 104'' to receive a bushing 106 in which the adjusting crank 107 of the spring mechanism has threaded mounting.

The rearwardly extending arms of the yoke-shaped plate 105 carry vertical pivot bolts 108 on which are fulcrumed bell-crank levers 109$^a$ and 109$^b$. These levers are arranged in pairs disposed above and below the yoke-shaped plate 105, as best shown in Figure 4, and the rearwardly extending arms of both pairs of levers pivotally engage over the projecting upper ends of the pivot posts 31', 31' of the two gangs. A washer 111 is preferably interposed between the lower lever of each pair and the adjacent brackets 33 and a similar washer is interposed between the companion levers.

A stop collar 112 is secured to the upper portion of each pivot post, as by a set screw 113, for holding each pair of levers against upward displacement from its post. The inwardly extending arms of the levers overlap, with the arms of the levers 109$^b$ bent together to engage between the arms of the levers 109$^a$, such arms of both pairs of levers having longitudinal slots 114 for receiving a vertical pivot bolt 115 passing therethrough. Referring to Figure 5, a clevis 116 embraces the slotted arms of the levers and supports the upper and lower ends of the pivot bolt 115. A spring guide rod 117 has its front end screwing into the clevis, and confined on this rod is a heavy compression spring 118 bearing at its front end against a collar 119, which abuts the rear end of the clevis 116. The adjusting crank 107 is formed with a relatively long hub 107' which is threaded externally for screwing through the threaded bore of the bushing 106. Said hub is hollow, the same serving as a guide for the rear end of the spring guide rod 117, which is free to slide longitudinally therein. The front end of said hub abuts against a collar 121, which is slidable upon the rod 117 and against which the rear end of the spring 118 bears. By screwing the adjusting crank forwardly or backwardly in the bushing 106, the pressure in the spring 118 can be increased or decreased. Such spring pressure thrusts forwardly through the clevis 116, tending to force the inwardly extending arms of the bell crank levers forwardly and to thereby swing the rearwardly extending arms inwardly towards each other. Thus, this spring pressure is effective as a continuous tension exerted between the pivot posts 31', tending to draw the same together, and inasmuch as this tension acts in a plane or along a line disposed considerably above the axial line of the bumpers 46, 46, the result is a continuous spring pressure tending to force the inner ends of the gangs downwardly.

In this connection it is to be noted that the pivots 55 between the inner and outer gang sections are disposed above the axis of the disk gangs. By virtue of this construction the tendency of the inner ends of the inner sections to rise upwardly under load resistance is materially reduced, the effect of the spring 118 to this end being thereby augmented. By connecting the outer gang sections to the outer ends of the inner gang sections at points spaced above the gang axes the inward thrust on the lower edges of the disks of the outer sections imposes a turning movement on the associated inner section which is opposite to the turning movement imposed on that inner section by the thrust on the lower edges of the disks of that section. That is, the inward thrust of the outer section is transmitted to the inner section at a point above the axis thereof while the thrust of the disks of the inner section is exerted below the axis.

Referring now to the operation of the implement, and assuming for the time being that the gangs are straightened, i. e., in transverse alignment as shown in full lines in Figures 2 and 3: If the operator wishes to angle the gangs while traveling forward, he pulls on the trip rope 74, thereby releasing the latch 65. This releases the tube 59 from the rear telescoping bar 58, permitting the tube to slide forwardly along the bar, with the result that the outer ends of the gangs are drawn forwardly relatively to the inner ends, the harrow thus assuming an angled condition as indicated approximately in dotted lines in Figure 2.

For adjusting to different degrees of angularity, he can release the trip rope 74 to permit the latch 65 to drop into any one of the series of pockets 78 in the bar 58, thereby locking the two gangs at the desired angle of cut. Assume now, that with the gangs in this angled position, the operator desires to straighten the gangs while still traveling forwardly. He pulls upon the trip rope 95, thereby releasing the latch 84 from the transverse notches 94, in which said latch is then engaging, with the result that the central draft member 18 is free to slide forwardly through the head 81. This pulls the inner ends of the two gangs forwardly up into the transverse plane of the outer ends, i. e., moves the gangs from the position illustrated in dotted lines in Figure 2 to the position illustrated in full lines, while the tractor is still travelling straight ahead. The latch 84 is released to snap back into the proper notches 94 when the gangs have been brought into alignment. These same angling and straightening operations can be performed with the tractor moving backwardly. For example, to angle the gangs while backing up, the trip rope 95 is pulled to release the latch 84, with the result that the central draft member 18 is caused to slide backwardly in the head 81, forcing the inner ends of the gangs rearwardly with respect to the outer ends. The resulting position of the gangs is approximately indicated in dotted lines in Figure 3. Assume now, that with the tractor backing up, it is desired to straighten the gangs.

The trip rope 74 is pulled at this time, to release the latch 65, which permits the tube 59 to telescope back over the bar 58, with the result that the outer ends of the gangs are thrust rearwardly, relatively to the inner ends and the two gangs are thereby brought into alignment. From the foregoing, it will therefore be seen that the gangs can be angled or straightened while travelling ahead, or can be angled or straightened while backing up. As previously remarked, this is of great advantage in the field, as it enables the tractor to be driven forwardly or backwardly, in extricating itself from a mired-in condition in soft ground, at the same time straightening the gangs with either direction of travel, to lighten the load on the tractor. Moreover, this ability to angle or straighten the gangs selectively in either direction of travel, speeds up operations and facilitates the handling of the harrow. It should be noted that, in effecting any of these adjustments from an angled position to a straightened position, or vice-versa, the two latches 65 and 84 can be released alternately, so that part of the relative movement in any one adjustment occurs between the bar 58 and tube 59, and the remaining part occurs between the tube 59 and head 81. By thus using different combinations of these two adjustments, different gradations of adjustment can be obtained. When the range of one adjustment has been exhausted in one direction—as when the bar 58 has been moved to one limit of its movement in the tube 59, or the head 81 has been moved to one limit of its movement along the outer side of the tube 59—the parts can be readily restored to a midway or intermediate position, so that a range of adjustment is available in either direction for each of such relatively movable parts.

It will be noted that in all of these adjustments the tube 59 functions as an intermediate connecting member to which the draft is applied directly, the bar 58 sliding within this intermediate member and the head 81 sliding over the outside of said member.

If the implement should be cultivating along a ridge, the inner ends of the gangs are free to rise relatively to the outer ends, the consequent separating motion between the upper ends of the pivot posts 31' being accommodated through outward swinging movement of the bell crank levers 109ᵃ and 109ᵇ, which yieldably thrust backwardly against the pressure of the spring 118. If, on the other hand, the implement should be travelling lengthwise in a depression, the inner ends of the gangs are free to swing downwardly relatively to the outer ends, being normally urged in this direction by the action of the spring 118 creating a tension between the upper ends of the pivot posts 31'. If, because of extremely hard soil conditions, the opposing thrusts of the two gangs tend to force the inner ends of the gangs upwardly, such can be overcome by turning the adjusting crank 107 in a direction to increase the pressure on the spring 118; or if, conversely, the soil conditions are such that the spring pressure acting on the inner ends of the gangs tends to force them to an excessive depth of penetration, relatively to the outer ends, such can be overcome by appropriately rotating the adjusting crank 107 to relieve the pressure on the spring 118.

It will be understood that in passing over obstructions or down into hollows, the inner ends of the gangs are free to swing upwardly or downwardly, at which time the bell crank levers 109ᵃ and 109ᵇ are oscillated slightly and the spring guide rod 117 is slid rearwardly or forwardly in the tubular hub 107'. The rearwardly extending arms of the aforesaid bell crank levers function as links for connecting the upper ends of the pivot posts 31' with the yoke-shaped plate 105, whereby to cooperate with the lower yoke arms 61 in holding the inner ends of the gang frames against tipping fore and aft.

I wish it to be understood that while I have described specifically a certain preferred construction illustrated in the drawings, my invention is not limited to that particular construction, but includes such variations or modifications as would occur to those skilled in the art. The claims hereinafter made are, therefore, to be construed accordingly.

I claim:

1. In a disk harrow adapted to be propelled forwardly and rearwardly by a draft force, the combination of two oppositely extending disk gangs, means associated with said gangs to swing the outer ends thereof in a generally fore and aft direction relative to the adjacent ends, means associated with the gangs to swing the adjacent ends of the gangs in a generally fore and aft direction relative to the outer ends, draft means for applying a draft force to said first two means, and means for controlling the application of the draft force to said two first mentioned means.

2. In a disk harrow adapted to be propelled forwardly and rearwardly by a draft force, the combination of two oppositely extending disk gangs, means associated with said gangs and operative when shifted either forwardly or rearwardly to swing the outer ends thereof in a generally fore and aft direction relative to the adjacent ends, means associated with the gangs and also operative when shifted either forwardly or rearwardly to swing the adjacent ends of the gangs in a generally fore and aft direction relative to the outer ends, draft means for applying a draft force to said first two means, and optionally operated means for diverting the draft force in either direction to either of said first mentioned means.

3. In a disk harrow adapted to be propelled forwardly and rearwardly by a draft force, the combination of two oppositely extending disk gangs, means connected with the outer ends of the gangs to shift said ends in a generally fore and aft direction relative to the adjacent ends of the gangs, means connected with the inner ends of the gangs to shift said inner ends relative to the outer ends, draft means for applying a draft force to said first two means, and means for optionally connecting and disconnecting said first two means with said draft means.

4. In a disk harrow, the combination of two oppositely extending disk gangs, a draft member for transmitting draft thereto, means providing for fore and aft adjustment of the outer portions of said gangs relatively to said draft member, and means providing for fore and aft adjustment of the inner portions of said gangs relatively to said draft member.

5. In a tractor-drawn disk harrow, the combination of two oppositely extending disk gangs, a draft member, draft means for transmitting draft from said draft member to the inner portions of said disk gangs, said draft means being movable longitudinally relatively to said draft member, draft means for transmitting draft to the outer portions of said disk gangs, said latter draft means also being movable longitudinally relatively to said draft member, and mechanism for controlling the movement of either of said draft means relatively to said draft member.

6. In a disk harrow adapted to be propelled by a tractor, the combination of two oppositely extending disk gangs, a draft member, draft mechanism movable relatively to said draft member and operatively connected with the inner portions of said gangs, draft mechanism movable relatively to said draft member and operatively connected with the outer portions of said gangs, and latch devices releasable from the tractor controlling relative movement between each of said draft mechanisms and said draft member.

7. In a disk harrow adapted to be propelled by a tractor, the combination of two oppositely extending disk gangs, a tubular draft bar, a draft device mounted for sliding telescopic movement within said draft bar, a second draft device mounted for sliding movement along the outer side of said draft bar, means operatively connecting one of said draft devices with the inner portions of said gangs, means operatively connecting the other of said draft devices with the outer portions of said gangs, and independently operating latch mechanisms releasable from the tractor for controlling the sliding movement of each of said draft devices relatively to said draft bar.

8. In a disk harrow adapted to be propelled by a tractor, the combination of two oppositely extending disk gangs, a tubular draft member, a draft bar mounted for sliding telescopic movement within said tubular draft member, yoke means pivotally connecting said bar with the inner portions of said disk gangs, a latch device mounted on said tubular draft member and adapted to engage with locking shoulders on said bar for holding the latter against movement relatively to said draft member, means for releasing said latch device from the operator's position on the tractor, a head mounted for sliding movement along the outer side of said tubular draft member, outwardly extending draft bars pivotally connected at their front ends with said head and pivotally connected at their rear ends with the outer portions of said disk gangs, a latch device mounted on said head adapted to engage with locking shoulders on said tubular draft member for holding said head against sliding movement along said draft member, and means for releasing said latter latch device from the operator's position on the tractor.

9. In a disk harrow, the combination of two oppositely extending disk gangs, draft means connected therewith, and spring means operatively connected to exert a tension between the inner ends of the gangs along a line displaced vertically from the axes of the gangs.

10. In a disk harrow, the combination of two disk gangs, bumpers at the inner ends of said gangs adapted to contact with each other, and spring means operatively connected to exert a tension between the inner ends of the gangs along a line displaced vertically from the plane of said bumpers.

11. In a disk harrow, the combination of two oppositely extending mutually reacting disk gangs, draft means connected therewith, and adjustable spring mechanism mounted on the inner ends of the gangs and operatively connected to resist the up-thrust of the inner ends of the gangs occasioned by the mutual reactance thereof.

12. In a disk harrow, the combination of two oppositely extending mutually reacting disk gangs, draft means connected therewith, and spring mechanism for resisting the up-thrust of the inner ends of the gangs occasioned by the mutual reactance thereof comprising horizontally swinging lever means operatively connected with said gangs.

13. In a disk harrow, the combination of two oppositely extending mutually reacting disk gangs, draft means connected therewith, and spring mechanism for resisting the up-thrust of the inner ends of the gangs occasioned by the mutual reactance thereof, comprising a spring, and two horizontally swinging levers operatively connected to transmit the pressure of said spring to the inner ends of said gangs.

14. In a disk harrow, the combination of two oppositely extending mutually reacting disk gangs, draft means connected therewith, and spring mechanism for resisting the up-thrust of the inner ends of the disk gangs occasioned by the mutual reactance thereof, said spring mechanism comprising a spring extending longitudinally of the harrow between the inner ends of the gangs, and levers operatively connected to transmit the pressure of the spring to the inner ends of the gangs.

15. In a disk harrow, the combination of two oppositely extending mutually reacting gangs, draft means connected therewith, a spring extending substantially horizontally in a plane between the inner ends of the gangs, means for adjusting the pressure of said spring, and bellcrank levers transmitting the pressure of said spring to the inner ends of said gangs for resisting the up-thrust of said gangs occasioned by the mutual reactance thereof.

16. In a tractor-drawn disk harrow, the combination of two oppositely extending mutually reacting disk gangs, spring mechanisms operatively connected to resist the up-thrust of the inner ends of said gangs occasioned by the mutual reactance thereof, and draft means connected with said gangs and comprising means utilizing the tractive energy of the tractor for angling or straightening the gangs when travelling forwardly and also utilizing the tractive energy of the tractor for angling or straightening the gangs when travelling rearwardly.

17. In a disk harrow, the combination of two oppositely extending disk gangs, spring means operatively connected to exert a tension between the inner ends of the gangs along a line disposed above the axes of the gangs, a draft member, means providing for fore and aft adjustment of the outer portions of said gangs relatively to said draft member, and means providing for fore and aft adjustment of the inner portions of said gangs relatively to said draft member.

18. In a disk harrow, the combination of two disk gangs, draft means connected therewith, and means for changing the angle between said gangs, one of said gangs comprising two sections pivotally connected for relative movement in a vertical plane.

19. In a disk harrow, the combination of two disk gangs, draft means connected therewith, and means for changing the angle between said gangs, each of said gangs comprising two flexibly connected sections, capable of relative rocking movement in passing over uneven ground.

20. In a disk harrow, the combination of two disk gangs, draft means connected therewith, and means for changing the angle between said gangs, each of said gangs comprising inner and outer sections connected together whereby said outer section can be swung to an inoperative position relatively to said inner section.

21. In a disk harrow, the combination of two oppositely extending disk gangs, posts rising vertically from the gangs, and means at the upper ends of said posts for yieldingly urging said posts towards each other to resist up-thrust of the inner ends of the gangs relative to the horizontal.

22. In a disk harrow, the combination of two oppositely extending disk gangs, posts extending upwardly from the inner ends of the gangs, and means urging the upper ends of the posts towards each other.

23. In a disk harrow, the combination of two oppositely extending disk gangs, a bearing for each of the gangs, posts rigid on said bearings and extending upwardly therefrom, and spring means for urging the ends of the posts towards each other.

24. In a disk harrow, the combination of two oppositely extending disk gangs, a bearing for the inner end of each gang, a post extending upwardly from each bearing, a draft member pivotally connected to said posts, and means connected to the upper ends of the posts for urging them towards each other.

25. In a disk harrow, the combination of two oppositely extending disk gangs, posts extending upwardly from the inner ends of the gangs, and means urging the upper ends of the posts towards each other, said means comprising a supporting member, a pair of bell-cranks pivoted on said member and having one arm pivotally connected to said posts, respectively, and spring means carried by said member and acting through the other arms of said bell-cranks tending to rotate said cranks in opposite directions.

26. In a disk harrow, the combination of two oppositely extending disk gangs, bumper members of arcuate formation at the inner ends of the gangs adapted to contact with each other, posts extending outwardly from said gangs, the axes of said posts passing substantially through the center of curvature of said bumpers, and means for urging the ends of said posts towards each other.

27. In a disk harrow, the combination of two oppositely extending disk gangs, bumper members of arcuate formation at the inner ends of the gangs adapted to contact with each other, posts extending outwardly from said gangs, the axes of said posts passing substantially through the center of curvature of said bumpers, means for urging the ends of said posts towards each other, and draft means comprising a yoke pivotally connected to said posts.

28. In a disk harrow, the combination of two oppositely extending disk gangs, bumper means of arcuate formation at the inner ends of said gangs adapted to contact with each other, draft means comprising a yoke pivotally connected with the disk gangs at their inner portions on upwardly extending pivot axes disposed proximately to the inner gang end disks, a member movable longitudinally with respect to said draft means, and links pivotally connected at one end to said gangs near their outer ends and having their opposite ends connected with said member.

29. In a disk harrow, the combination of two oppositely extending disk gangs, a bumper means of arcuate formation at the inner ends of said gangs adapted to contact with each other, a draft member comprising a yoke pivotally connected with the disk gangs at their inner ends on upwardly extending pivot axes disposed between the two innermost disks of each gang, a member slidable on said draft member, and links pivotally connected at one end to said gangs near their outer ends and having their opposite ends connected with said member.

30. In a disk harrow, the combination of two oppositely extending disk gangs, bumper means of arcuate formation at the inner ends of said gangs adapted to contact with each other, each gang having a bearing between the two innermost disks, respectively, a draft member comprising a yoke having pivotal connection with the disk gangs on upwardly extending axes at said bearings, a member movable with respect to said draft means, and links pivotally connected at one end to said gangs near their outer ends and having their opposite ends connected with said member.

31. In a disk harrow, the combination of two oppositely extending disk gangs, bumper means of arcuate formation at the inner ends of said gangs adapted to contact with each other, each gang having a bearing adjacent the inner end disk, a draft member comprising a yoke having pivotal connection with said bearings, a member slidable with respect to said draft member, and links pivotally connected at one end to said gangs near their outer ends and having their opposite ends connected with said member.

32. In a disk harrow, the combination of two oppositely extending mutually reacting disk gangs, draft means associated therewith, and adjustable spring mechanism mounted on the gangs and operatively connected to resist the upthrust of the ends of the gangs occasioned by the mutual reaction thereof.

33. In a disk harrow, the combination of two oppositely extending disk gangs, draft means connected therewith, and spring means operatively connecting the inner ends of the gangs to exert a force therebetween along a line displaced vertically from the axes of the gangs.

34. In a disk harrow, the combination of two oppositely extending disk gangs, draft means connected therewith, and force exerting means operatively connecting the inner ends of the gangs along a line displaced vertically from the axes of the gangs.

35. In a disk harrow, the combination of two oppositely extending disk gangs, posts rising vertically from the gangs, and means at the upper ends of said posts for yieldingly resisting relative movement between the upper ends of the posts.

36. In a disk harrow, the combination of two oppositely extending disk gangs, spring means operatively connected between the inner ends of the gangs along a line disposed above the axes of the gangs, a draft member, and means providing for angular adjustment of said gangs relatively to said draft member.

37. In a disk harrow, the combination of two oppositely extending disk gangs, spring means operatively connected between the inner ends of the gangs along a line disposed above the axes of the gangs, a draft member, means providing for fore and aft adjustment of the outer portions of said gangs relatively to said draft member, and means providing for fore and aft adjustment of the inner portions of said gangs relatively to said draft member.

38. In a disk harrow, the combination of two oppositely extending disk gangs, posts rising vertically from the gangs, and means between the upper ends of the posts tending to cause relative movement of the upper ends of the posts in a horizontal plane to resist vertical thrust of the inner ends of the gangs relative to the horizontal.

39. In a disk harrow, the combination of two oppositely extending disk gangs, posts extending upwardly from the inner ends of the gangs, and means between the upper ends of the posts urging said upper ends to move in a horizontal plane.

40. In a disk harrow, the combination of two oppositely extending disk gangs, a bearing for each of the gangs, posts rigid on said bearings and extending upwardly therefrom, and spring means between the upper ends of the posts tending to cause relative movement of said upper ends of the posts in a horizontal plane.

41. In a disk harrow, the combination of two oppositely extending disk gangs, a bearing for the inner end of each gang, a post extending upwardly from each bearing, a draft member pivotally connected to said posts, and means connected to the upper ends of the posts for urging such upper ends of the posts to move in a horizontal plane with respect to each other.

42. In a disk harrow, the combination of two oppositely extending disk gangs, posts extending upwardly from the inner ends of the gangs, and means at the upper ends of the posts tending to cause relative movement of the upper ends of the posts in a horizontal plane, said means comprising a supporting member, a pair of bellcranks pivoted on said member and having one arm pivotally connected to said posts, respectively, and spring means carried by said member and acting through the other arms of said bellcranks tending to rotate said cranks in opposite directions.

43. In a disk harrow, the combination of two oppositely extending disk gangs, bumper members of arcuate formation at the inner ends of the gangs adapted to contact with each other, posts extending outwardly from said gangs, the axes of said posts passing substantially through the center of curvature of said bumpers, and means at the outer ends of the posts tending to cause relative movement thereof in a horizontal plane.

44. In a disk harrow, the combination of two oppositely extending disk gangs, bumper members of arcuate formation at the inner ends of the gangs adapted to contact with each other, posts extending outwardly from said gangs, the axes of said posts passing substantially through the center of curvature of said bumpers, means at the outer ends of the posts tending to cause relative movement of the outer ends of the posts in a horizontal plane, and draft means comprising a yoke pivotally connected to said posts.

45. In a disk harrow, the combination of two oppositely extending mutually reacting disk gangs, draft means associated therewith, and adjustable spring mechanism mounted on the gangs and operatively connected to resist vertical movement of the ends of the gangs occasioned by the mutual reaction thereof.

46. In a disk harrow, the combination of two oppositely extending disk gangs, spring means operatively connected to exert a tension between the inner ends of the gangs along a line disposed above the axes of the gangs, a draft member, and means providing for fore and aft adjustment of one end of each of the gangs relative to said draft member.

47. In a disk harrow, the combination of a pair of gangs, each of said gangs comprising two sections, bearings on each of said sections, a scraper frame for each section supported by the bearings thereon, draft means connected with the bearings of one of said sections, and means connecting the scraper frames of said two sections whereby draft is transmitted through said connecting means to the other of said sections.

48. In a disk harrow, the combination of a pair of gangs, each gang comprising two sections, bearings on each section, a scraper frame for each section supported by the bearings thereon, draft means connected to the bearings of one section, said frames being pivotally connected together whereby draft is transmitted from one section to the other while permitting angular movement between the sections in a vertical plane.

49. In a disk harrow, the combination of a pair of gangs, each of said gangs comprising two axially aligned sections, and means connecting the two sections together at points above the axes of the sections, whereby the inward reaction of the outer section is transmitted to the inner section above the axis of the disks thereof.

50. In a disk harrow, the combination of a pair of gangs, each of said gangs comprising two axially aligned sections, and means connecting the two sections together for relative pivotal movement at points above the axes of the sections, whereby the inward reaction of the outer section is transmitted to the inner section above the axis of the disks thereof.

51. In a disk harrow, the combination of a pair of gangs, each of said gangs comprising two axially aligned sections, and means connecting the two sections comprising draft transmitting frames associated with said sections and pivotally connected together at points above the axes of the sections, whereby the inward reaction of the outer section is transmitted to the inner section above the axis of the disks thereof.

52. The combination with a disk harrow having two oppositely extending disk gangs, of draft means for transmitting draft force thereto, including members connected with the outer portions of said gangs and adapted to be actuated by the force of forward draft applied to said draft means to shift the outer ends of said gangs forwardly with respect to the inner ends thereof, connections adapted to be actuated by the force of forward draft applied to said draft means to shift the inner ends of said gangs forwardly with respect to the outer ends thereof, and means for selectively controlling said shifting operations.

53. In a disk harrow, the combination of two oppositely extending disk gangs, draft means for transmitting draft thereto including optionally operable connections adapted to be actuated by forward draft force applied to said draft means to shift either the outer ends of said gangs forwardly with respect to the inner ends thereof or the inner ends of said gangs forwardly with respect to the outer ends thereof, and means for selectively controlling said shifting operations.

54. In a disk harrow, the combination of two oppositely extending disk gangs, draft means for transmitting draft thereto, including optionally operable connections adapted to be actuated by rearward draft force applied to said draft means to shift either the outer ends of said gangs rearwardly with respect to the inner ends thereof or the inner ends of said gangs rearwardly with respect to the outer ends thereof, and means for selectively controlling said shifting operations.

CHARLES H. WHITE.